(12) United States Patent
Qiu (10) Patent No.: US 6,785,351 B1
(45) Date of Patent: Aug. 31, 2004

(54) METHOD AND SYSTEM FOR DOPPLER FREQUENCY ESTIMATION

(75) Inventor: Robert Caiming Qiu, Morris Plains, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 516 days.

(21) Appl. No.: 09/640,316

(22) Filed: Aug. 16, 2000

(51) Int. Cl.$^7$ .......................... H03D 1/04; H03D 1/06; H03K 5/01; H03K 6/04; H04B 1/10

(52) U.S. Cl. ................ 375/346; 375/285; 375/227; 455/226.1; 455/67.3; 455/63

(58) Field of Search ................ 375/224, 227, 375/285, 340, 346, 348; 455/501, 504, 506, 63, 226.1, 296, 67.3

(56) References Cited

U.S. PATENT DOCUMENTS

| 6,072,841 A | * | 6/2000 | Rahnema | 375/325 |
| 6,182,251 B1 | * | 1/2001 | Rahnema et al. | 714/704 |
| 6,256,338 B1 | * | 7/2001 | Jalloul et al. | 375/142 |
| 6,275,525 B1 | * | 8/2001 | Bahai et al. | 375/232 |
| 6,327,314 B1 | * | 12/2001 | Cimini et al. | 375/340 |
| 6,330,432 B1 | * | 12/2001 | Tong et al. | 455/226.3 |
| 6,505,053 B1 | * | 1/2003 | Winters et al. | 455/504 |
| 6,603,962 B1 | * | 8/2003 | Tong et al. | 455/226.3 |

* cited by examiner

Primary Examiner—Jean B. Corrielus (57) ABSTRACT

A method is provided for determining the Doppler frequency shift that occurs in the reception of a communication signal when the relative velocity between the transmitted and receiver is unknown. By estimating the channel characteristics and measuring the channel response to known transmitted data bits, a measure of the Doppler frequency is determined according to the method of the invention. In particular, a good estimate of the Doppler frequency shift is obtained based on a second order statistic of the fading process for the channel response to the known transmitted data bits. The approach is simple and general. It applies for any system such as WCDMA and CDMA 2000 when Doppler frequency is needed.

7 Claims, 5 Drawing Sheets

METHOD AND SYSTEM FOR DOPPLER FREQUENCY ESTIMATION

RELATED APPLICATION

This application is related to application Ser. No. 09/255,088, filed Feb. 22, 1999, now abandoned entitled, "Method and System for Compensation of Channel Distortion Using LaGrange Polynomial Interpolation," and application Ser. No. 09/395,140, filed Sep. 14, 1999, now abandoned entitled, "Method for the Adaptive Compensation of Channel Distortion Using Doppler Frequency Estimation," having the same inventor and assignee as the present application. Each of those related applications is incorporated herein by reference.

FIELD OF THE INVENTION

This invention is related to digital signal processing, particularly to the estimation of Doppler frequency shift in digital mobile radio communication systems.

BACKGROUND OF THE INVENTION

Digital mobile radio communication is plagued by distortion in the transmission channel. A significant cause of such distortion is the shift in frequency, i.e., the Doppler shift, caused by the relative motion between a transmitter and receiver. As is known in the art, the Doppler frequency shift may be determined when the relative velocities of the receiving and transmitting systems are known. However, while knowledge of Doppler shift is important to distortion-compensation arrangements (as well as for other purposes), in a typical mobile communication system neither the direction nor the velocity of the mobile unit is known. Hence, the relative velocity between the transmitter and the receiver, and correspondingly the Doppler frequency shift, are unknown quantities.

In digital communications systems, compensation for channel distortion is commonly based on information derived from the insertion of known symbols—e.g., pilot symbols, at regular intervals in the data stream. When these pilot symbols are recovered at the receiver, any deviation from their known values is taken to be caused by the distortion in the channel. From these deviations, the channel response may be estimated. Various methods of compensating for variations in the channel are known in the art, typically involving a determination of a set of weight factors for an equalizing filter. In general, however, these methods have been found to be of limited use in a dynamically changing signal environment as in a mobile wireless communication system—where the relative velocity between receiver and transmitter is continually varying. Where one method of compensation may provide acceptable performance under one range of velocity conditions, this same method may not achieve acceptable performance under a different set of such velocity conditions. A distortion compensation methodology was disclosed in the cross-referenced co-pending application, Ser. No. 09/255,088, now abandoned in which compensation weight factors are determined as a function of the Doppler frequency shift between the transmitted and received signal. In this method, if the Doppler frequency can be accurately estimated, then good compensation for the channel distortion may be achieved. However, because the relative velocity between the transmitting and receiving systems is often unknown for wireless mobile systems, an independent means for determining the Doppler frequency shift is required.

SUMMARY OF THE INVENTION

The present invention provides an efficient method of determining the Doppler frequency shift that occurs in the reception of a communication signal when the relative velocity between the transmitted and receiver is unknown. By estimating the channel characteristics and measuring the channel response to known transmitted data bits, a measure of the Doppler frequency is determined according to the method of the invention. In particular, a good estimate of the Doppler frequency shift is obtained based on a second order statistic of the fading process for the channel response to the known transmitted data bits. The Doppler frequency shift may then be applied to a process that determines compensation weighting factors to adjust the channel in response to a Doppler shift, as well as for other purposes to which Doppler shift information is needed.

BRIEF DESCRIPTION OF THE FIGURES

The advantages, nature and various additional features of the invention will appear more fully upon consideration of the illustrative embodiments now to be described in detail in connection with the accompanying drawings. In the drawings.

DETAILED DESCRIPTION

The invention is directed to a method for determining a Doppler frequency shift that occurs when a non-zero relative velocity exists between a transmitting site and receiving site in a wireless communications system. Although the Doppler frequency shift parameter finds utility in a variety of applications, including handoff of a mobile unit between serving base stations and estimation of distortion compensation parameters in wireless communications systems, the methodology of the invention will be described herein in the context of the distortion compensation application. It should, however, be understood that all feasible applications are contemplated as within the scope of utility for Doppler frequency shift parameters developed according to the methodology of the invention. In a similar vein, application of the methodology of the invention is described hereafter in terms of a preferred embodiment based on a DS-CDMA wireless system. It will, however, be apparent to those skilled in the art that the inventive methodology may be applied for a variety of digital wireless systems such as TDMA or W-CDMA.

Figure 1:
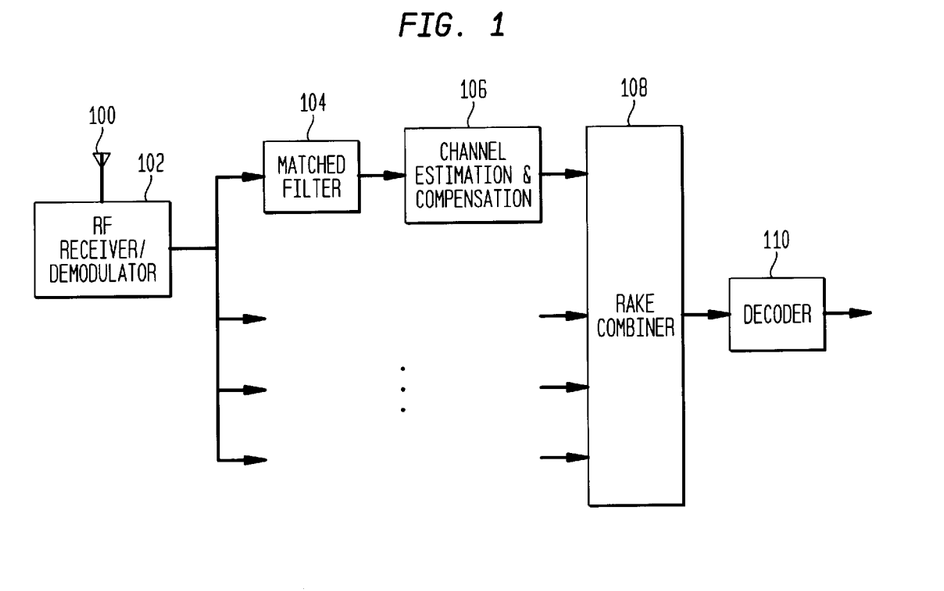
FIG. 1 is a block diagram of a typical DS-CDMA receiver.

FIG. 1 is a block diagram of a typical DS-CDMA receiver system for carrying out the method of the invention. An antenna 100 receives a spread-spectrum radio frequency (RF) signal. A typical carrier frequency in a cellular wireless system is 900 Megahertz and in a Personal Communication System (PCS) is 1900 Megahertz. RF receiver/demodulator 102 converts down from the carrier frequency. The result is an analog baseband signal, modulated by an encoded data stream, typically at 32 kilobits per second (kbps), and re-modulated by a spreading signal, typically at 4.096 megachips per second (Mcps). ("Chip" is the standard term for one cycle time of a spreading signal.) Data modulation may be based on any known methodology, but for purposes of the illustrative embodiment of the invention is taken to be quadrature phase shift keying (QPSK), which represents a data stream as a sequence of four-state symbols. A matched filter 104 removes the spreading signal by correlation with the phase of the spreading signal. The remaining analog baseband signal is processed by a channel estimation and compensation processor 106 to produce an estimate of the encoded data.

Because the RF signal received at antenna 100 will generally include the superposition of multiple images of the source transmission—representing different paths of propagation with different delays—multiple instances of the filter 104 and compensation processor 106 may be used to extract an estimate of the encoded data stream from each of several of the strongest paths of propagation. A RAKE combiner 108 linearly combines these estimates to produce a higher confidence combined estimate of the original encoded data. Finally, a decoder 110 extracts the original data transmission.

The signal at the input of a channel estimation and compensation processor 106 is a modulated baseband signal distorted by propagation though the channel caused by multi-path reflection, random noise and, in cases of mobile sites, Doppler shifting of the carrier frequency.

Recognizing that a time sequence of two-dimensional signals like those of a QPSK modulation may be represented as a complex function of time, the signal at the input of a channel estimation and compensation processor 106 can be expressed algebraically as:

$$u(t)=c(t)z(t)+n(t) \quad [1]$$

where c(t) is the complex, time-varying channel gain;
z(t) is the originally transmitted QPSK-modulated baseband signal; and
n(t) is random noise.

If one can compute a good estimate of c(t) (denoted hereafter as ĉ(t)) and n(t) is negligibly small or reduced to insignificance by averaging, then a good estimate of z(t) is:

$$\hat{z}(t) = \frac{u(t)}{\hat{c}(t)} \quad [2]$$

Equation 2 can be rearranged to solve for ĉ(t) and accordingly the approximate value of the channel distortion at any instant may be calculated from the values of the received signal and the original signal at that instant. If known pilot symbols with values p are inserted in the original signal at specific points in time, then the original signal is known at those points and the value of the channel distortion at those points may be calculated based on the value of the received signal at those points and the original pilot signal values. The "channel estimation" may then be derived as an interpolation of these sample values of the channel function at the pilot signal points.

None of the various methods heretofore known in the art for such insertion and recovery of known symbols provides a perfect solution for the distortion compensation problem. For example, one such estimation method uses only a few symbols at a time which makes this method vulnerable to noise. Another exemplary method uses an experimental method to determine a fixed set of estimation formulae. These fixed estimation formulae do not adjust to the changing conditions that exist during operation in a real channel.

An improved methodology for determining channel gain based on inserted pilot symbols was disclosed by the inventor in the cross-referenced co-pending application, Ser. No. 09/255,088 abandoned. The key features of that improved methodology can be understood in conjunction with the channel estimation and compensation processor depicted in FIG. 2. In the figure, an input baseband signal u(t) 500 is processed by a symbol synchronization module 408 and a block synchronization module 406. Outputs of the symbol and block timing modules are processed to produce a pilot symbol sample clock 504 that controls an analog-to-digital sample circuit 402 (depicted with a switch-like symbol) to cause digital values of pilot symbol signals to be sent to the complex multiplier 511. The output of the complex multiplier 511 represents an estimate of the channel gain at the time of a particular channel symbol. This estimate is sent to the delay line 512.

Figure 2:
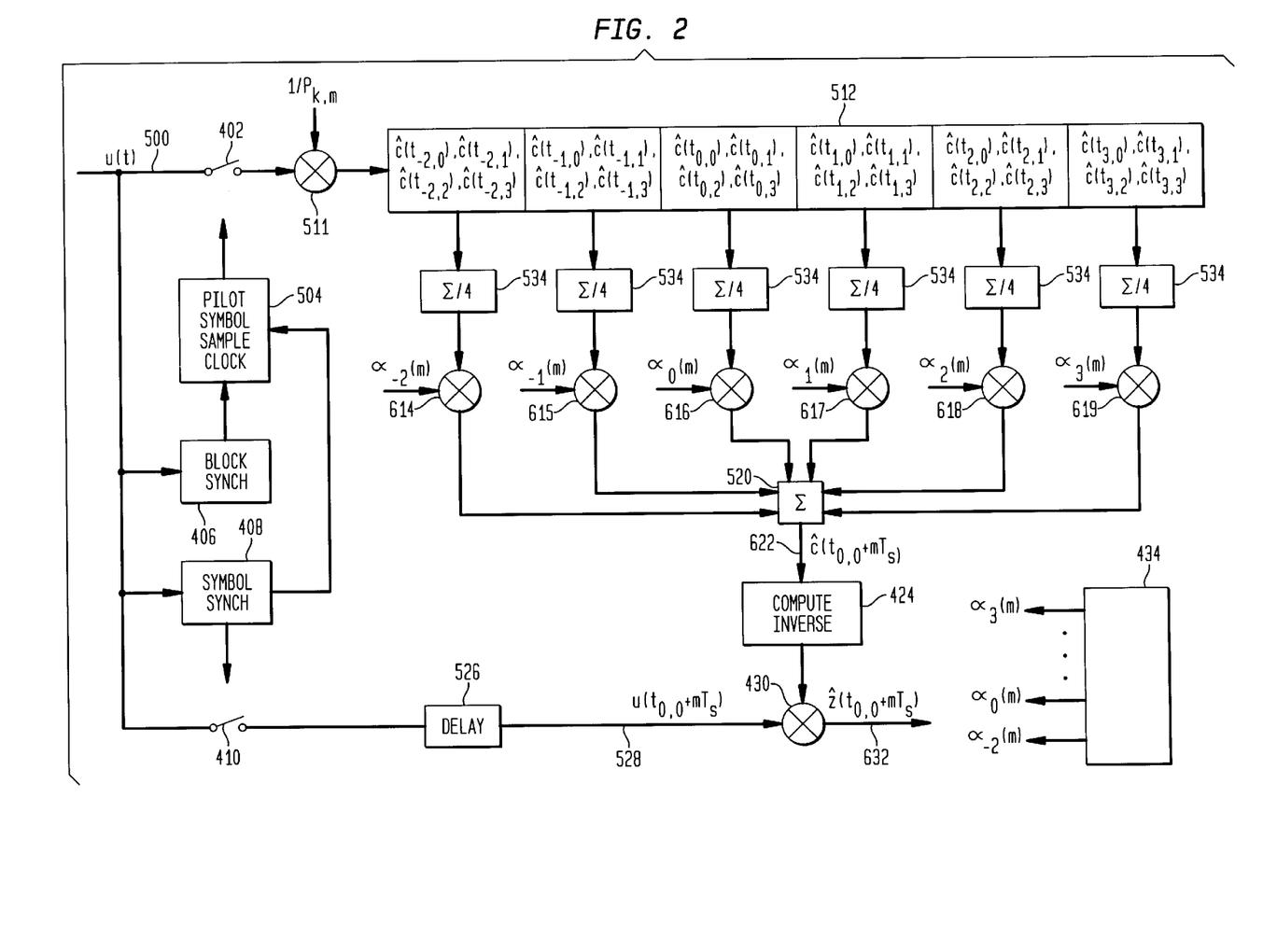
FIG. 2 depicts a channel estimation and compensation processor operative to carry out a distortion compensation methodology as disclosed in cross-referenced co-pending application Ser. No. 09/255,088 now abandoned.

The symbol synchronization module 408 also controls an analog-to-digital sample circuit 410 (depicted with a switch-like symbol) that operates to cause digital values of the input baseband signal u(t) 500 at each pilot symbol time to be stored in a delay line 526.

Figure 3:
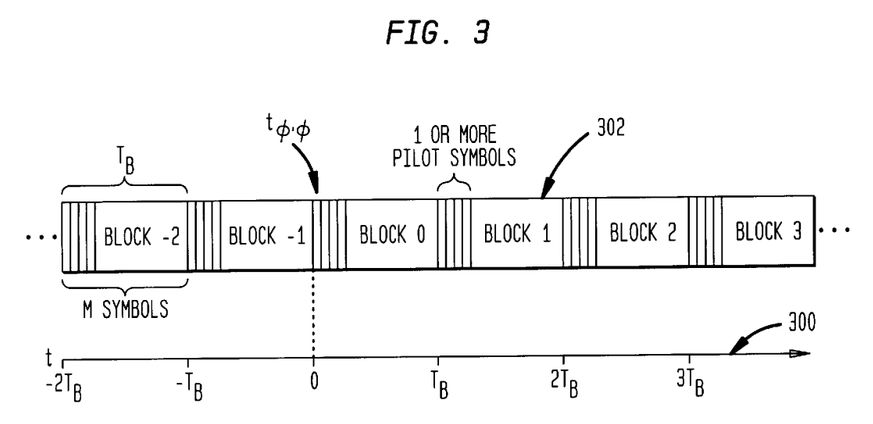
FIG. 3 is a diagram of a data stream divided into blocks with pilot symbols inserted at the beginning of each block.

Consider briefly FIG. 3, which shows a data stream 302 divided into ordered, consecutive blocks of M symbols each. The period of transmission of each block is $T_B$. At the beginning of each block, one or more known pilot symbols are inserted in the data stream 302.

Now, considering FIGS. 2 and 3 together, application of the method of the cross-referenced application for estimation of channel gain for the symbols in an arbitrarily chosen block 0 in the data stream 302 of FIG. 3 will be described. With reference to the time frame 300 in FIG. 3, a symbol sample time $$t_{k,m} = NT_B + \left(\frac{m}{N}\right)T_B \quad [3]$$

is the sample time of the mth symbol in the kth block. Pilot symbols are sampled at $t_{k,m}$, is where k=−2, −1, 0, 1, 2, 3 and m=0, 1, 2, 3—that is, there are four pilot symbols at the beginning of each block, and the symbols from blocks −2, −1, 0, 1, 2, and 3 are used for channel estimation. For each input pilot symbol sample $U(t_{k,m})$, the complex multiplier 511 computes $$\hat{c}(t_{k,m})=u(t_{k,m})/p_{k,m}=c(t_{k,m})+n(t_{k,m})/p_{k,m} \quad [4]$$

where k=−2, −1, 0, 1, 2, 3, m=0, 1, 2, 3, and $p_{k,m}$ is the known value of a pilot symbol at position m in block k. These channel gain estimates are stored in the delay line 512.

Complex averaging modules 534 are used to average the four channel gain estimates associated with the four consecutive pilot symbols at the start of each block that are stored in the delay line 512. This averaging operates to minimize the error associated with the noise term of Equation 4. It should be understood, as well, that the use of more than four symbols per block would effect an even better cancellation of the noise error.

Complex multipliers 614, 615, 616, 617, 618, and 619 are used to multiply the outputs of averaging modules 534 by appropriate weighting coefficients $\alpha_{-2}(m)$, $\alpha_{-1}(m)$, $\alpha_0(m)$, $\alpha_{-1}(m)$, $\alpha_2(m)$, and $\alpha_3(m)$, and the multiplier results are summed in complex adder 520. The resulting sum 622 (at the output of adder 520), representing channel gain estimates, is therefore represented algebraically as:

$$\hat{c}(t_{0,m}) = \hat{c}(t_{0,0} + mT_s) = \hat{c}\left(t_{0,0} + \frac{m}{N}T_B\right) = \sum_k \frac{\alpha_k(m)}{P} \sum_{m=0}^{P-1} \hat{c}(t_{k,m}) \quad [5]$$

where $-0.5(r-2) \leq k \leq 0.5\,r$ for even r, and $-0.5(r-1) \leq k \leq 0.5(r-1)$ for odd r.

The estimation weighting coefficients, $\alpha$, are determined as follows (with $$\left(\text{with } q = \frac{m}{N}\right).$$

For even r:

$$\alpha_k(m) = \frac{(-1)^{0.5r+k}}{(0.5r - 1 + k)!\,(0.5r - k)!(q - k)} \prod_{a=1}^{r}(q + 0.5r - a) \quad [6]$$

For odd r:

$$\alpha_k(m) = \quad [7]$$

$$\frac{(-1)^{0.5(r-1)+k}}{(0.5r - 0.5 + k)!\,[0.5(r-1) - k]!(q - k)} \prod_{a=0}^{r-1}[q + 0.5(r-1) - a]$$

With reference again to the channel estimation and compensation processor of FIG. 2, the inverse of resulting sum 622 is then computed by complex multiplicative inverter 424. A baseband symbol sample 528 is generated by delay line 526, where the delay is established to synchronize that baseband symbol sample with the computation of the estimated channel gain at the same sample time. Complex multiplier 430 then multiplies the output of inverter 424 with symbol sample 528 to generate an estimate of an original data symbol 632 in accordance with Equation 2.

While the heretofore describe distortion compensation methodology clearly provides an improvement over prior-art methods, simulation studies have shown that different rates of motion between a mobile station and a fixed station impact the efficacy of the methodology. Accordingly, a distortion-compensation methodology that provides an efficacious result over all rates of motion for the mobile unit was described by the inventor in the cross-referenced co-pending application, Ser. No. 09/255,088, abandoned in which compensation weight factors are determined as a function of the Doppler frequency shift between the transmitted and the received signal. That methodology determines weight factors that minimize the Mean Square Error between the actual signal response and the estimated signal response by using a Doppler frequency that is related to the mobility of the mobile station as:

$$f_D = \frac{\mu f_c}{c} \quad [8]$$

where $f_D$ is the Doppler frequency;
$\mu$ is the velocity of the mobile station;
$f_c$ is the frequency of the carrier; and'
c is the speed of light.

The estimation of the channel distortion may be generally expressed as:

$$\hat{c}(t) = \alpha_1 \hat{h}(t_1) + \alpha_2 \hat{h}(t_2) + \alpha_3 \hat{h}(t_3) + \ldots + \alpha_n \hat{h}(t_n) \quad [9]$$

where
c(t) is the estimated channel response at sample time t;
$\alpha_i$ is the weighting factor coefficient for the i-th sample; and
$\hat{h}(t)$ is the measured channel response for the i-th sample and can be expressed as:

$$\hat{h}(t_i) = c(t_i) + n(t_i) \quad [10]$$

The channel distortion estimation of Equation 9 can be written in the general form:

$$\hat{c}(t_i) = \sum_{i=1}^{N} \alpha_i \hat{h}(t_i) \quad [11]$$

In this form, it can be seen that the estimated channel response at sample time t may be represented as the output of a Finite Impulse Response (FIR) filter with coefficients $\alpha_i$.

According to the invention, the estimation and compensation processor estimates the distortion and determines weight factor coefficients, $\alpha_i$, needed to minimize the mean square error (MSE) between the actual signal response and the estimated signal response.

As is well known, the MSE may be defined as the Expected value of the error between the actual signal and estimated signal responses. Expressed algebraically:

$$MSE(\tau) = E\{[F(\tau)][F(\tau)^*]\} \quad [12]$$

where
$F(\tau) = c(\tau) - \hat{c}(\tau)$ is the random error of a symbol in the $\tau_{th}$ sample; and
$F(\tau)^* = [c(\tau) - \hat{c}(\tau)]^*$ is the complex conjugate of the error function.

As is also known, the correlation function is a measure of the mutual relationship of one function to another function. Correspondingly, the auto-correlation function describes the mutual relationship between two values of the same function, and can be expressed as:

$$R_{xx}(\tau) = E\{x(t+\tau)x(\tau)^*\} \quad [13]$$

where
$x(\tau)$ is a random function at time t; and
$x(t+\tau)$ is the value of the random function x(t) at time (t+$\tau$).

The correlation of the error function may now be expressed as:

$$R_{FF}(\tau) = E\{F(t+\tau)F(\tau)^*\} \quad [14]$$

Using a relationship between the auto-correlation of the of the noise component in a selected data block and the MSE for the channel response for the selected data block, and following the MSE minimization methodology, it was shown in the cross-referenced co-pending application, Ser. No. 09/255,088, now abandoned that the weight factors used to compensate for channel-induced distortion could be determined from:

$$\alpha = R_{cc}^{-1} R_i \quad [15]$$

where
$R_{cc}^{-1}$ is the inverse of the channel response auto-correlation matrix, $R_{cc}$, which was shown to be:

$$R_{cc} = \begin{bmatrix} R_{cc}(0) + R_{nn}(0) & R_{cc}(t_1 - t_2) & \ldots & R_{cc}(t_1 - t_N) \\ R_{cc}(t_2 - t_1) & R_{cc}(0) + R_{nn}(0) & \ldots & R_{cc}(t_2 - t_N) \\ \ldots & \ldots & \ldots & \ldots \\ R_{cc}(t_N - t_1) & R_{cc}(t_N - t_2) & \ldots & R_{cc}(0) + R_{nn}(0) \end{bmatrix}$$

and $R_i$ was shown to be:

$$R_i = \begin{bmatrix} R_{cc}(t_1 - \tau) \\ R_{cc}(t_2 - \tau) \\ \\ R_{cc}(t_N - \tau) \end{bmatrix}$$

An exemplary application of the distortion-compensation method of the cross-referenced co-pending application, Ser. No. 09/255,088 now abandoned is hereafter described in connection with an estimation and compensation processor used in a typical wireless communication channel receiver as illustrated in FIG. 4.

Figure 4:
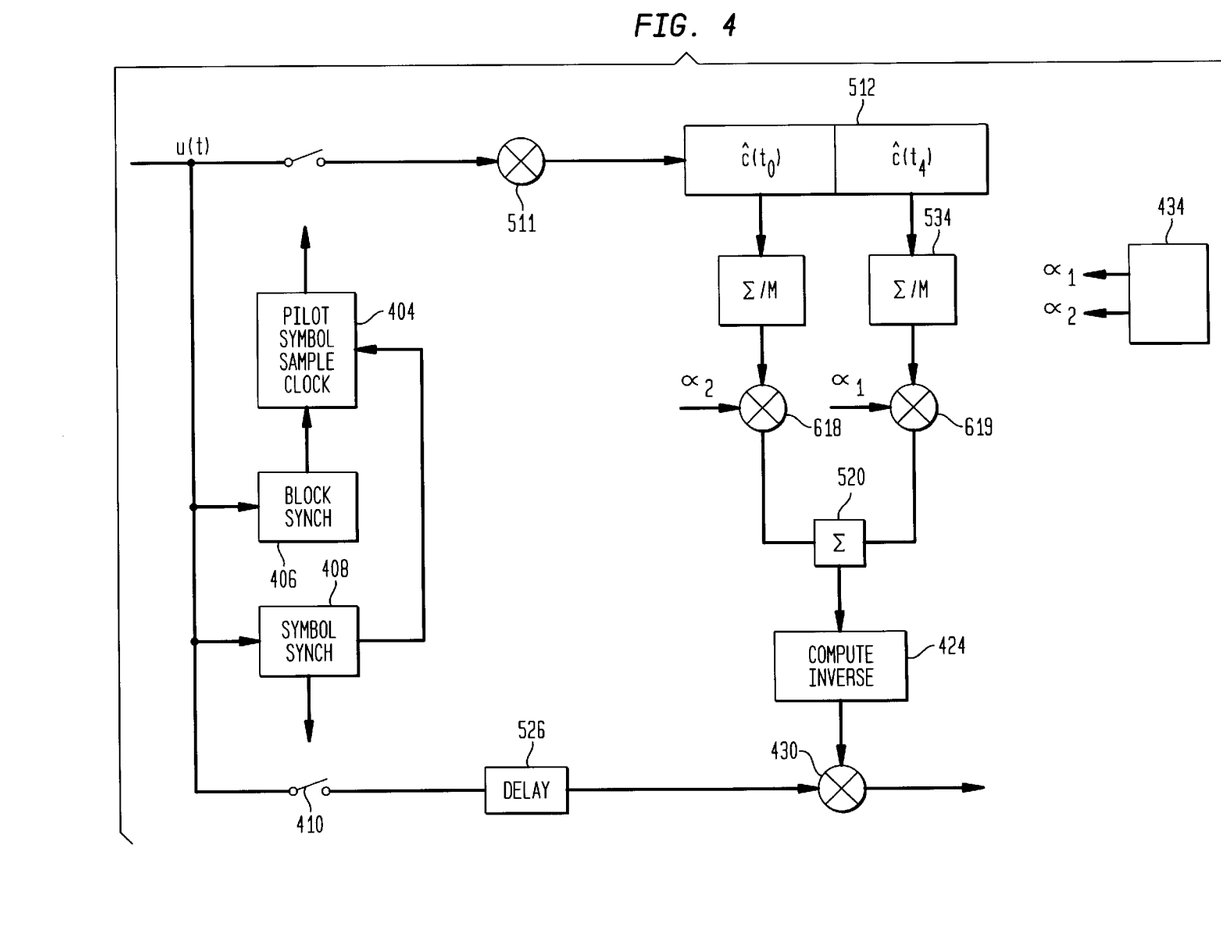
FIG. 4 depicts a channel estimation and compensation processor operative to carry out a distortion compensation methodology as disclosed in cross-referenced co-pending application Ser. No. 09/395,140 now abandoned.

The weight estimation and compensation processor illustrated in FIG. 4 is similar in operation to the processor depicted in FIG. 2, which has already been described. However, for the case illustrated in FIG. 4, the estimate of channel distortion is not limited to using only the pilot bits that may be contained in a data block to estimate the channel distortion at a specific time. Rather the estimate of channel distortion may also be made by determining, for example, an average value of all of the symbols or bits in the data blocks under consideration. Accordingly, the operation of functional block 534 depends upon the specific operation performed by functional block 512. As was previously discussed, in regard to FIG. 2, when function block 512 contains values of 4 pilot bits contained in each data block, then the operation of functional block 534 determines the average value of these 4 pilot bits. In the example, disclosed in regard to FIG. 4, the contents of the data block (i.e., M bits) are used in function block 512 to estimate the channel distortion. However, the method is equally applicable to using only the pilot symbols when they are available.

The compensation weight factor coefficients for the N=2 estimation and compensation processor illustrated may be determined from Equation 15 as:

$$\begin{bmatrix} \alpha_1 \\ \alpha_2 \end{bmatrix} = \frac{1}{det(R_{cc})} \begin{bmatrix} R_{cc}(0) + R_{nn}(0) & -R_{cc}(t_1 - t_2) \\ -R_{cc}(t_2 - t_1) & R_{cc}(0) + R_{nn}(0) \end{bmatrix} \begin{bmatrix} R_{cc}(t_1 - \tau) \\ R_{cc}(t_2 - \tau) \end{bmatrix}$$

and may be rewritten as:

$$\begin{bmatrix} \alpha_1 \\ \alpha_2 \end{bmatrix} =$$

$$\frac{1}{det(R_{cc})} \begin{bmatrix} ([R_{cc}(0) + R_{nn}(0)])(R_{cc}(t_1 - \tau)) & (-R_{cc}(t_1 - t_2))(R_{cc}(t_2 - \tau)) \\ (-R_{cc}(t_2 - t_1))(R_{cc}(t_1 - \tau)) & ([R_{cc}(0) + R_{nn}(0)])(R_{cc}(t_2 - \tau)) \end{bmatrix}$$

Typically, and as known in the art, a wireless communication channel may be characterized as a Rayleigh fading channel or a Rician fading channel. These channel representations are used to mathematically determine the signal response characteristics of a communication channel. Assume now that the wireless channel is a Rayleigh fading channel, the auto-correlation characteristic of which is well known in the art as:

$$R_{cc}(\tau) = \sigma_{cc}^2 J_0(2\pi f_D \tau) \quad [17]$$

where
  $\sigma_{cc}^2$ is the power of the signal at $\tau=0$, i.e., $R_{cc}(0)$;
  $J_0(\ldots)$ is Bessel Function of the first kind, of order zero;
  $f_D$ is the Doppler frequency of the signal.

The two compensation weight factor coefficients of FIG. 4 may now be determined by first computing the determinate of the channel-response cross-correlation matrix $R_{cc}$ as:

$$det(R_{cc}) = (R_{cc}(0) + R_{nn}(0))^2 - R_{cc}^2(t_1 - t_2)$$

And using the relationships of Equations 16 and 17, the determinate of the matrix $R_{cc}$ is obtained as:

$$det(R_{cc}) = (\sigma_{cc}^2 + \sigma_{nn}^2)^2 - J_0^2(2\pi f_D T_B)$$

where
  $R_{cc}(0) = \sigma_{cc}^2$ is the power of the actual channel;
  $\sigma_{nn}^2$ is the power of the noise component,
wherein $$\frac{\sigma_{cc}^2}{\sigma_{nn}^2}$$

is the Signal to Noise Ratio (SNR); and
  $T_B$ is the time period of a single block (i.e., $t_1-t_2$)

From Equation 16, the weight factor coefficients may be determined as:

$$\alpha_1 = \frac{(1 + \sigma_{nn}^2)J_0^2(2\pi f_D(t_1 - \tau)) - J_0(2\pi f_D T_B)J_0(2\pi f_D(t_2 - \tau))}{(1 + \sigma_{nn}^2)^2 - J_0^2(2\pi f_D T_B)}$$

and $$\alpha_2 = \frac{(1 + \sigma_{nn}^2)J_0^2(2\pi f_D(t_2 - \tau)) - J_0(2\pi f_D T_B)J_0(2\pi f_D(t_1 - \tau))}{(1 + \sigma_{nn}^2)^2 - J_0^2(2\pi f_D T_B)}$$

where $\sigma_{cc}^2$ is arbitrarily set equal to unity.

Referring again to FIG. 4, complex averaging modules 534 are used to average the two channel-gain estimates associated with the M symbols of each block that are stored in delay line 512. This averaging minimizes the error associated with the noise term. Complex multipliers 619 and 618 are used to multiply the outputs of averaging modules 534 by appropriate weighting factor coefficients $\alpha_1$ and $\alpha_2$, respectively. Weighting factor coefficients $\alpha_1$ and $\alpha_2$ are

[16]

generated by processor 434 in accordance with the method of the invention expressed in Equation 47. The multiplier results are summed in complex adder 520. Complex multiplier 424 then inverts the resultant sum. A baseband symbol sample, is generated by delay line 526 and the complex multiplier 430 multiples the output of inverter 424 with the delayed symbol sample to generate an estimate of an original data symbol.

As can be seen from the foregoing, a measure of Doppler frequency shift can be important to a determination of distortion compensation for a communications channel. Doppler frequency shift is also a factor in determining handoff arrangements for wireless mobile units, as well as in other mobile communications applications. A new methodology is disclosed and described herein for the estimation of Doppler frequency shift based on pilot signals received via a communications channel.

A received baseband signal u(t) can be represented algebraically as:

$$u(t)=h(t)z(t)+n(t) \quad [18]$$

where z(t) is the transmitted signal, n(t) represents random noise, and h(t) represents complex fading coefficients for the channel, having amplitude and phase. Typically h(t) is a zero-mean, wide-sense stationary complex random process. Often, h(t) will be estimated from a specially transmitted signals—so-called pilot signals—with z(t) known a priori.

The relationship of such pilot signals to the information symbols transmitted in a block of data is illustrated in FIG. 3, where one or more pilot signals are shown preceding the information symbols for each block of data, $T_B$. For purposes of the invention, the pilot signals may be user-dedicated pilot symbols, such as are used in WCDMA systems, as well as pilot channels such as used in IS-95 and CDMA 2000 systems. As will be apparent from the following discussion, the methodology of the invention provides an estimate of the Doppler frequency shift which is independent of the transmitted value or form of the pilot signals.

According to the method of the invention, an estimation of the Doppler frequency shift for the channel fading process, h(t), is made based on second-order statistics of h(t), in particular, the auto-correlation function. That auto-correlation function, $R_{hh}(\tau)$, can be defined as follows:

$$R_{hh}(\tau)=E\{h(t+\tau)h(t)\} \quad [19]$$

where E{ } denotes the expectation value. Although the methodology described herein is applicable to the general case for the auto-correlation function $R_{hh}(\tau)$, in an exemplary embodiment to be described hereafter, the well-accepted Clark's model, as applied for a Rayleigh fading channel, is used to describe the auto-correlation function of the channel fading process. For the Clark's model, the auto-correlation function can be described algebraically as:

$$R_{hh}(\tau)=J_0(2\pi f_m\tau)\approx 1-\tfrac{1}{4}(2\pi f_m\tau)^2 \quad [20]$$

where $J_0(\ )$ is the zero-order Bessel function of the first kind, and $f_m$ is the maximum Doppler frequency to be estimated according to the methodology of the invention. The methodology is valid for small $f_m\tau$ and is believed to have wide utility.

With the methodology of the invention, the Doppler frequency shift can be estimated based solely on the received pilot signals. That methodology is implemented according to the following steps:

1. Estimate the auto-correlation function values $R_{hh}(\tau)$ at $\tau=t_1, t_2, \ldots, t_N$, using the pilot signals. This can be achieved through use of the received signals, u(t), at symbol locations $t=t_1, t_2, \ldots, t_N$. Without loss of generality, it can be assumed that the transmitted signal, z(t), is known to be at a "1" state. Therefore, $R_{hh}(\tau)=R_{uu}(\tau)-R_{nn}(\tau)$, where $R_{uu}(\tau)$ is the auto-correlation function for the received signal and $R_{nn}(\tau)$ is the auto-correlation function for the present noise.

2. Using the relationships of step 1 and the Clark's model for the auto-correlation function, simple algebraic manipulation gives the Doppler frequency estimator:

$$f_m = \frac{1}{\pi}\sqrt{\frac{R_{hh}(t_2)-R_{hh}(t_1)}{(t_1+t_2)(t_1-t_2)}} = \frac{1}{\pi}\sqrt{\frac{R_{uu}(t_2)-R_{uu}(t_1)}{(t_1+t_2)(t_1-t_2)}} \quad [21]$$

where $R_{uu}(\tau)$ will be available directly from the received signals in a typical CDMA or TDMA system, $t_1$, and $t_2$ are any two symbol locations, and it being understood that the average noise power at $t_1$, is equal to the average noise power at $t_2$—therefore the noise factor auto-correlation terms for locations $t_1$, and $t_2$ are equal.

Figure 5:
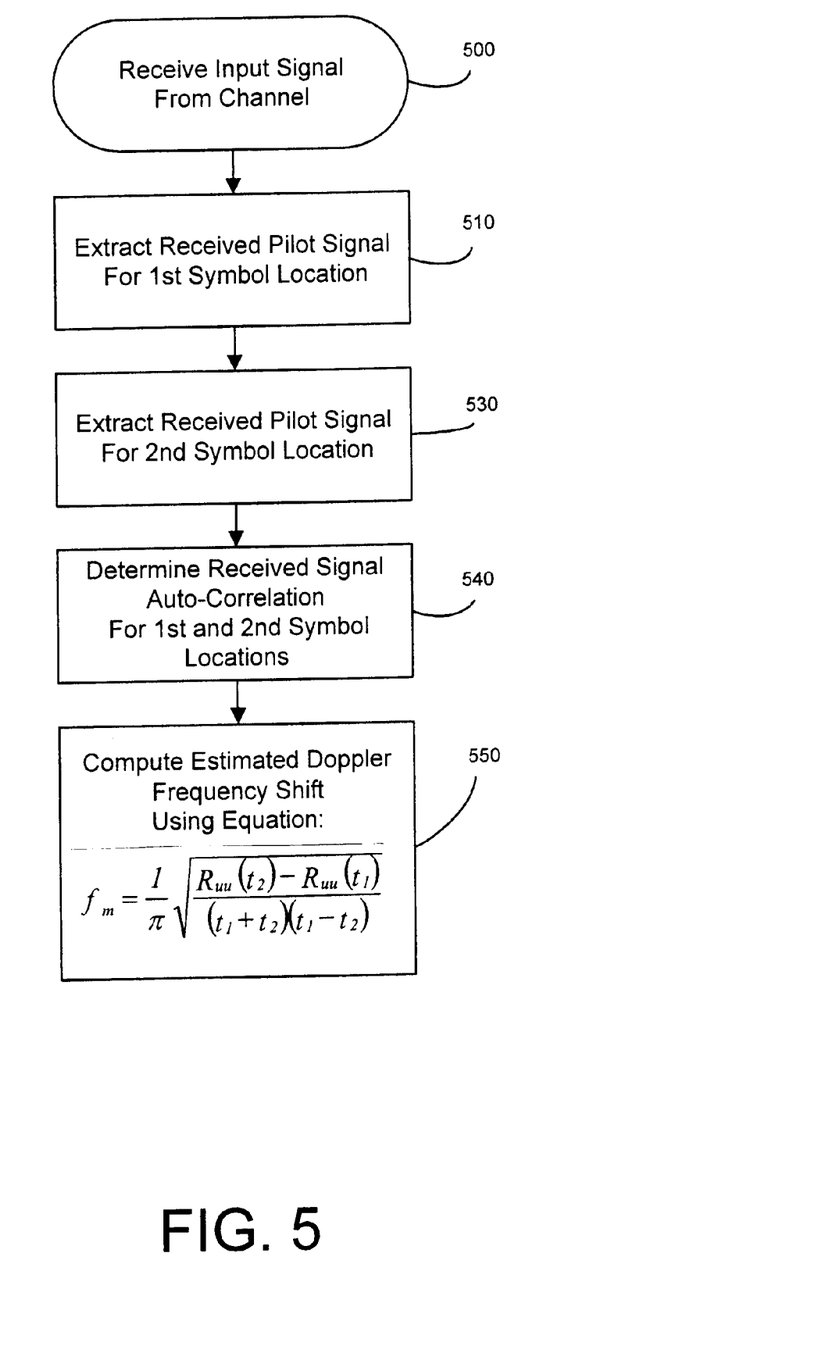
FIG. 5 is a flowchart showing the Doppler frequency estimation method of the invention.

A flow diagram for the methodology of the invention is depicted in FIG. 5. Considering the figure, the method begins with receipt, at a receiver, of an input signal from the channel, in step 500. From that received input signal, pilot signals are extracted for a first symbol location in step 510, and for a second symbol location in step 530. Using the pilot signals extracted in steps 510 and 530, a received signal auto-correlation, $R_{uu}(\tau)$, is determined in step 540 for the received pilot signals. The received signal auto-correlation is then used, along with the temporal values of the first and second symbol locations, to compute the estimated Doppler frequency shift, in step 550. As indicated in the figure, the computation of the estimated Doppler frequency shift is, for the illustrated embodiment, carried out in accordance with Equation 21 above.

As will be apparent, the estimated Doppler frequency shift is robust in the presence of noise since the estimator in Equation [21] is independent of the present noise power. It is also to be noted that the estimator works for non-Gaussian noise n(t), as well.

Since $R_{hh}(\tau)=R_{uu}(\tau)-R_{nn}(\tau)$ (assuming h(t) and n(t) are uncorrelated), $R_{hh}(t_2)-R_{hh}(t_2)=R_{uu}(t_2)-R_{uu}(t_1)$ irrespective of the type of noise or the presence of noise.

The estimator in Equation [21] is provided as an illustrative embodiment for a Doppler frequency estimator based only on received pilot signals, and in particular, their second-order statistics. In environments where the Clark's model breaks down, a different form of the auto-correlation function values would, of course, be utilized, but the derivation of a corresponding Doppler frequency estimator will be apparent to those skilled in the art from the described methodology for the Clark's model. The invention is intended to encompass all forms of a Doppler frequency shift estimators using such second-order statistics of the channel process.

A novel approach has been described for estimation of Doppler frequency shift using only information provided by received pilot signals, particularly the second-order statistics of the channel fading process. The method of the invention should not be construed to be limited solely to the illustrative embodiments. Further the method of the invention should not be construed to be limited solely to Rayleigh or Rician channels.

Rather the method of the invention may be adapted to any wireless communication system.

Although the methodology of the invention, and illustrative applications of that methodology, have been described in detail, it should be understood that various changes, alterations, and substitutions may be made therein without departing from the spirit and scope of the invention as defined by the appended claims.

What is claimed is:

1. In a wireless communication system wherein a fading process for a channel in said communications system is characterized by a known channel fading process, a method for determining a Doppler frequency shift induced in a signal between two stations comprising the steps of:

determining a value for an auto-correlation function of said channel fading process based on a signal received from said channel, said auto-correlation function having a Doppler frequency component; and estimating said Doppler frequency shift as a function of said determined auto-correlation function value;

wherein said function of said determined auto-correlation function value for estimating said Doppler frequency shift is specified as $$f_m = \frac{1}{\pi}\sqrt{\frac{R_{uu}(t_2) - R_{uu}(t_1)}{(t_1 + t_2)(t_1 - t_2)}}$$

where $f_m$ is the estimated Doppler frequency, $R_{uu}(\tau)$ is an auto-correlation function value for the received signal and $t_1$ and $t_2$ are any two symbol locations for the received signal.

2. The method as recited in claim 1 wherein said received signal auto-correlation function value is determined in relation to a received signal at a first symbol location and a received signal at a second symbol location.

3. The method as recited in claim 2 wherein said received signal at said first symbol location and said received signal at said second symbol location are determined in reference to transmitted signals having known values.

4. The method as recited in claim 1 wherein said channel fading response model is based on a Rayleigh channel.

5. The method as recited in claim 1 wherein said channel fading response model is based on a Rician channel.

6. A method for determining a Doppler frequency shift induced in a channel between two stations of a wireless communications system, the channel being characterized in terms of a known channel fading process, the method comprising the steps of:

receiving a signal from said channel;

extracting from said received signal a symbol value received at first and a second symbol locations;

determining an auto-correlation for said extracted received symbol values based on an auto-correlation function for said known channel fading process; and computing an estimated Doppler frequency shift for said channel as a function of said determined auto-correlation according to the relation:

$$f_m = \frac{1}{\pi}\sqrt{\frac{R_{uu}(t_2) - R_{uu}(t_1)}{(t_1 + t_2)(t_1 - t_2)}}$$

where $f_m$, is the estimated Doppler frequency, $R_{uu}(\tau)$ is the determined auto-correlation for the received symbol values and $t_1$ and $t_2$ are temporal values for said first and second symbol locations.

7. The method of claim 6 wherein said received symbol values are pilot signal values.

* * * * *